US006108015A

United States Patent [19]

Cross

[11] Patent Number: 6,108,015

[45] Date of Patent: Aug. 22, 2000

[54] CIRCUITS, SYSTEMS AND METHODS FOR INTERFACING PROCESSING CIRCUITRY WITH A MEMORY

[75] Inventor: Randolph A. Cross, Poway, Calif.

[73] Assignee: Cirrus Logic, Inc., Fremont, Calif.

[21] Appl. No.: 08/552,197

[22] Filed: Nov. 2, 1995

[51] Int. Cl.$^{7}$ .................................................. G06F 15/76

[52] U.S. Cl. .......................... 345/519; 345/508; 345/513

[58] Field of Search .......................... 395/519, 501–503, 395/511, 508, 509, 513, 520, 526; 345/112, 185, 189, 201

[56] References Cited

U.S. PATENT DOCUMENTS

| | | | |
|---|---|---|---|
| 4,969,126 | 11/1990 | Maeno | 365/189.12 |
| 5,012,408 | 4/1991 | Conroy | 364/200 |
| 5,148,272 | 9/1992 | Acampora et al. | 348/397 |
| 5,212,742 | 5/1993 | Normile et al. | 282/166 |
| 5,274,453 | 12/1993 | Mueda | 348/584 |
| 5,327,173 | 7/1994 | Nishizawa et al. | 348/412 |
| 5,335,322 | 8/1994 | Mattison | 395/501 |
| 5,386,234 | 1/1995 | Velzman et al. | 348/409 |
| 5,432,900 | 7/1995 | Rhodes et al. | 395/807 |
| 5,450,542 | 9/1995 | Lehman et al. | 395/512 |
| 5,517,612 | 5/1996 | Dwin et al. | 395/501 |
| 5,559,999 | 9/1996 | Maturi et al. | 395/550 |
| 5,572,655 | 11/1996 | Tuljapurkar et al. | 345/189 |

FOREIGN PATENT DOCUMENTS

| | | |
|---|---|---|
| 0 510 640 A2 | 10/1992 | European Pat. Off. . |
| 0 522 853 A3 | 1/1993 | European Pat. Off. . |
| 0 545 323 A1 | 6/1993 | European Pat. Off. . |
| 0 658 053 A1 | 6/1995 | European Pat. Off. . |
| 0 673 171 A2 | 9/1995 | European Pat. Off. . |
| 2083578 | 3/1990 | Japan . |
| 2083579 | 3/1990 | Japan . |

OTHER PUBLICATIONS

Asian Test Symposium, 1992, "Functional Tests for Arbitraton SRAM–type FIFOs" by van de Goor et al. pp. 96–101, IEEE.

J. Fandrianto et al., A programmable Solution for Standard Video Compression, COMPCON '92, San Francisco, CA, pp. 47–50, Feb. 24, 1992.

*Primary Examiner*—Kee M. Tung
*Attorney, Agent, or Firm*—James J. Murphy; Steven A. Shaw

[57] ABSTRACT

A processing system 100 is provided which includes processing circuitry 103 fabricated on an integrated circuit chip 107. An internal memory 104*a* is also fabricated on chip 107. A first first-in/first-out memory 201 is provided having an input for receiving data retrieved from the internal memory 104*a* and an output for providing data to processing circuitry 103. An external memory 104*b* is provided. A second first-in/first-out memory 202 includes an input for receiving data retrieved from the external memory 104*a* and an output for providing data to the processing circuitry 103.

28 Claims, 3 Drawing Sheets

CIRCUITS, SYSTEMS AND METHODS FOR INTERFACING PROCESSING CIRCUITRY WITH A MEMORY

TECHNICAL FIELD OF THE INVENTION

The present invention relates in general to data processing systems and in particular to circuits, systems and methods for interfacing processing circuitry with a memory.

BACKGROUND OF THE INVENTION

A typical processing system with video/graphics display capability includes a central processing unit (CPU), a display controller coupled with the CPU by a system bus, a system memory also coupled to the system bus, a frame buffer coupled to the display controller by a local bus, peripheral circuitry (e.g., clock drivers and signal converters), display driver circuitry, and a display unit. The CPU generally provides overall system control and, in response to user commands and program instructions retrieved from the system memory, controls the contents of graphics images to be displayed on the display unit. The display controller, which may for example be a video graphics architecture (VGA) controller, generally interfaces the CPU and the display driver circuitry, exchanges graphics and/or video data with the frame buffer during data processing and display refresh operations, controls frame buffer memory operations, and performs additional processing on the subject graphics or video data, such as color expansion. The display driver circuitry converts digital data received from the display controller into the analog levels required by the display unit to generate graphics/video display images. The display unit may be any type of device which presents images to the user conveying the information represented by the graphics/video data being processed.

The frame buffer, which is typically constructed from dynamic random access memory devices (DRAMs), stores words of graphics or video data defining the color/grayshade of each pixel of an entire display frame during processing operations such as filtering or drawing images. During display refresh, this "pixel data" is retrieved out of the frame buffer by the display controller pixel by pixel as the corresponding pixels on the display screen are refreshed. Thus, the size of the frame buffer directly corresponds to the number of pixels in each display frame and the number of bits (Bytes) in each word used to define each pixel. The size and performance of frame buffer is dictated by a number of factors such as, the number of monitor pixels, the monitor DOT clock rate, display refresh, data read/write frequency, and memory bandwidth, to name only a few.

The frame buffer memory bandwidth is typically constrained by the speed of the memory devices available. For example, a pair of the fastest presently available 256k×16 DRAMs operating in the page mode can, without interleaving, only provide display refresh data to the display controller at a maximum of rate of 80 to 100 megabytes/second across a 32-bit interface. This limited range accounts not only for the limits on device access time but also for the fact that the frame buffer is simultaneously being burdened with other tasks such as cell refresh, off-screen memory accesses and writes to the on-screen memory. While the available bandwidth may be sufficient for systems driving displays with lower resolutions and/or lower bit depths, it will not support state of the art high resolution/high bit depth displays. For instance, a 1280 by 1024 pixel display with a pixel color depth of 8 bits/pixel being refreshed at 72 hertz requires data from the frame buffer (through the controller) at a rate of at least 130 megabytes/sec.

Interleaving of the DRAMs (or the random ports of VRAMs when VRAMs are used) of the frame buffer is a memory control/partitioning scheme used in some display systems to improve bandwidth. In a two bank interleaving scheme, the frame buffer is divided into odd and even banks from which data is alternately retrieved. Depending on the speed data is retrieved from each bank and the speed at which the controller switches between banks, substantial increases in the rate the controller receives data from the memory can be achieved. For example, assume that each bank outputs data at a rate of 40 MHz and the display controller switches between banks at a rate of 80 Mhz, the controller receives a stream of words from the frame buffer at approximately 80 MHz. For a given word width, the bandwidth of the memory is essentially doubled. Interleaving can be similarly extended to memories partitioned more than two banks.

While interleaving provides increased bandwidth, the complexity of implementing interleaving have limited its application to high end systems. In particular, the timing and control of the memory becomes a more precise and complicated task for the controller. Not only must the controller generate additional bank enable signals for switching between banks, but it must also generate the conventional DRAM control signals (RAS, CAS, OE) necessary to retrieve data from each bank at the appropriate times. In sum, for systems employing interleaving, enhanced controller hardware and/or software is typically required.

Thus, the need has arisen for circuits, systems and methods for constructing and controlling a memory. Such circuits, systems and methods should allow for the high speed access of data from memory without resort to complex timing schemes required by conventional interleaving techniques. Further, such circuits, systems and methods should be particularly applicable to the control and construction of graphic/video frame buffers.

SUMMARY OF THE INVENTION

In general, the principles of the present invention allow a controller to interface with both on-chip and off-chip memory. Among other things, the on-chip memory provides the controller with fast access storage. The off-chip memory allows the controller to interface with a memory which may be substantially larger than that which can be provided on-chip. Further, the controller/external memory interface of the present invention allows for the external memory to be expandable. Finally, the first-in/first-out registers (memories) employed in the novel interface of the present invention eliminate the complex timing schemes required in conventional interleaving schemes.

According to a first embodiment of the principles of the present invention, a processing system is provided which includes a controller fabricated on an integrated circuit chip along with an internal memory. A first first-in/first-out memory is provided having an input for receiving data retrieved from the internal memory and an output for providing data to the controller. An external memory is included which interfaces with the controller through a second first-in/first-out memory which has an input for receiving data retrieved from the external memory and an output for providing data to the controller.

According to another embodiment, a display data processing system is provided which includes an integrated circuit fabricated on a single chip. The integrated circuit includes a display controller, an internal frame buffer memory for providing display refresh data at a first predetermined rate through a corresponding data port, and a first first-in/first-out memory interfacing the data port of the internal frame buffer and an input port of the display controller. A second first-in/first-out memory is disposed in parallel with the first first-in/first-out memory and includes an output coupled to the input port of the display controller. An external frame buffer memory is included for providing display refresh data at a second predetermined rate through a corresponding data port coupled to an input of the second first-in/first-out memory.

According to a further embodiment of the principles of the present invention, a display system is provided including a display, a frame buffer, controller, and interface circuitry. The display is operable to display data as a plurality of pixels on a display screen. The frame buffer stores words of pixel data defining characteristics of corresponding pixels on the display screen, the frame buffer including an internal section forming a first part of an integrated controller/frame buffer device and an external portion. The controller forms a second part of the integrated controller/frame buffer device and controls the transfer of words of pixel data from the frame buffer to the display. The interface circuitry forms a third part of the integrated controller/frame buffer device and includes a first first-in/first-out memory for queuing words of pixel data being transferred from the internal section of the frame buffer to the controller and a second first-in/first-out memory for queuing words of pixel data being transferred from the external section of the frame buffer to the controller.

The principles of the present invention are also embodied in methods for interfacing a controller with a memory. According to one such method, first data is received from an internal memory at a first rate at the input of a first first-in/first-out memory. Second data is received from an external memory at a second rate at the input of a second first-in/first-out memory. A predetermined number of words of the first data are output from the first-in/first-out memory to the controller. Then, at least one word of data from the second first-in/first-out memory is output to the controller.

The circuits, systems and methods embodying the principles of the present invention have substantial advantages over the prior art. Among other things, such circuits, systems and methods allow for the high-speed access of data from memory without resort to the complex timing schemes required by conventional interleaving techniques. The principles of the present invention are particularly applicable to the control and construction of graphics video frame buffers. In this application, the present invention allows for construction of a large frame buffer which provides data to the controller with substantial bandwidth such that a large displays with high pixel depths can be supported.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
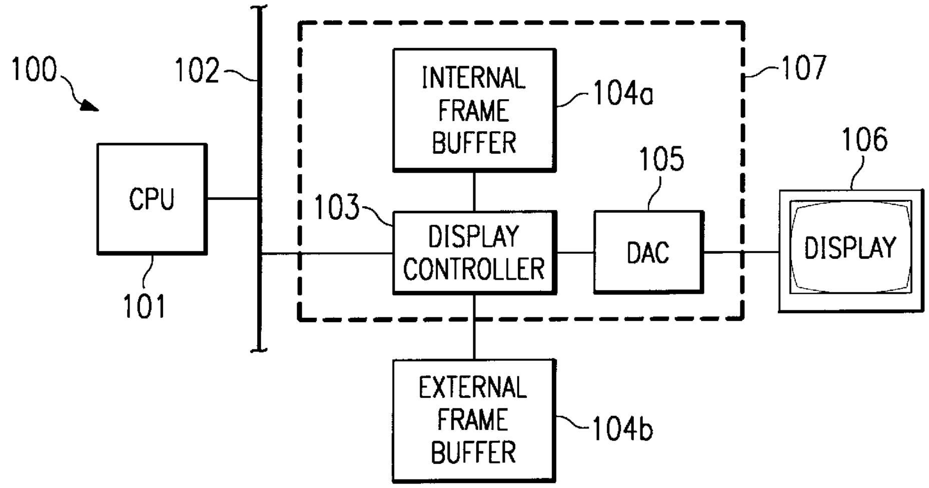
FIG. 1 is a high level functional block diagram of a graphics/video (display) processing system embodying the principles of the present invention.
Figure 2:
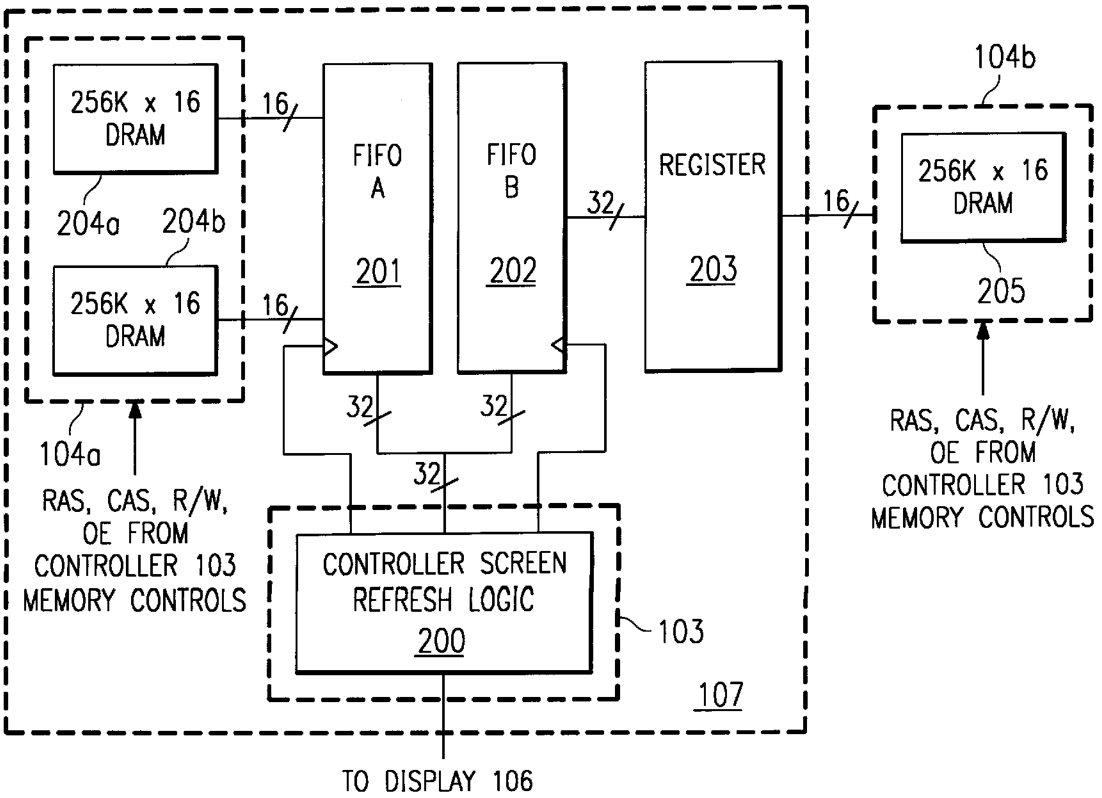
FIG. 2 is a more detailed functional block diagram emphasizing the refresh control portions of the controller and frame buffer depicted in FIG. 1 according to a first illustrative embodiment of the present invention.
Figure 3:
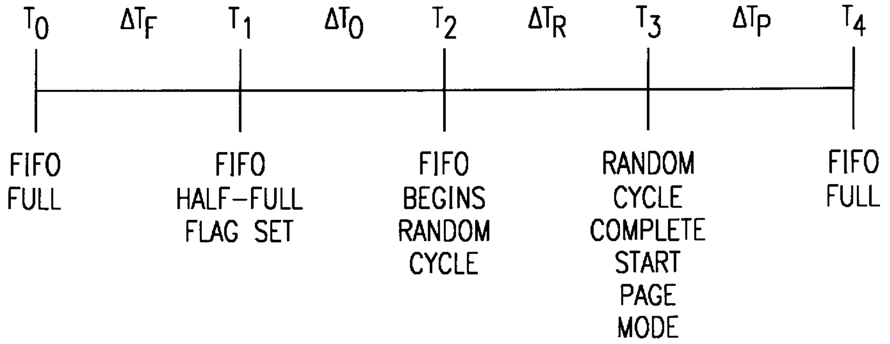
FIG. 3 is a time line illustrating selected timing relationships during typical operation of the circuitry of FIG. 2.

The principles of the present invention and their advantages are best understood by referring to the illustrated embodiment depicted in FIGS. 1–3 of the drawings, in which like numbers designate like parts.

For purposes of illustrating these examples, a display control system using a DRAM frame buffer will be used; however, it should be recognized that the principles of the present invention are not limited thereto but may be applied to a number of different processing systems and memory types as will become apparent from the discussion below.

FIG. 1 is a high level functional block diagram of the portion of a processing system 100 controlling the display of graphics and/or video data. System 100 includes a central processing unit 101, a system bus 102, a display controller 103, a frame buffer 104, a digital to analog converter (DAC) 105 and a display device 106. In accordance with the principles of the present invention frame buffer 104 includes an internal (on-chip) frame buffer section 104*a* and an external (off-chip) frame buffer section 104*b*. In a preferred embodiment of the present invention, display controller 103, internal frame buffer 104*a* and DAC 105 are fabricated together on a single integrated circuit chip 107.

CPU 101 controls the overall operation of system 100, determines the content of graphics data to be displayed on display unit 106 under user commands, and performs various data processing functions. CPU 101 may be for example a general purpose microprocessor used in commercial personal computers. CPU 101 communicates with the remainder of system 100 via system bus 102, which may be for example a local bus, an ISA bus or a PCI bus. DAC 105 receives digital data from controller 103 and outputs in response the analog data required to drive display 106. Depending on the specific implementation of system 100, DAC 105 may also include a color palette, YUV to RGB format conversion circuitry, and/or x- and y-zooming circuitry, to name a few options.

In the illustrated embodiment, controller 103 is a display controller, such as a VGA controller, which among other things, controls the exchange of graphics and/or video data with frame buffer 103, controls memory refresh, and performs data processing functions such as color expansion. A display controller is the "master" for the specific application of display and thus frees up CPU 101 to perform computational tasks. Moreover, the architecture of a display controller optimizes it to perform graphics and video functions in a manner for superior to that of a general purpose microprocessor. Controller 103 may also include a color palette, cursor generation hardware, and/or video to graphics conversion circuitry, to name a few options.

Frame buffer 104 is preferably a dynamic random access memory (DRAM) which includes an array of rows and columns of DRAM cells and associated address and control circuitry such as row and column decoders, read and write buffers, and sense amplifiers. Frame buffer 104 may also be constructed from various types of DRAMs including synchronous DRAMs (SDRAMs), cache DRAMs (CDRAMs), MDRAMS, RDRAMs, as well as static RAMs (SPAMs). Frame buffer 104 will be discussed in further detail below.

Display 106 may be for example a CRT unit or liquid crystal display, electroluminescent display (ELD), plasma display (PLD), or other type of display device displays images on a display screen as a plurality of pixels. Further, display 106 may be a state-of-the-art device such as a digital micromirror device or a silicon carbide like device which directly accepts digital data. It should also be noted that in alternate embodiments, "display" 106 may be another type of output device such as a laser printer or similar document view/print appliances.

FIG. 2 depicts a first embodiment of the display refresh interface between display controller 103, internal frame buffer 104*a* and external frame buffer 104*b* according to the principles of the present invention (the controller 103/system bus 102 interface is described further below in conjunction with FIG. 5). It should be recognized that internal frame buffer 104*a* and external frame buffer 104*b* may be different types of DRAMs or alternatively, one may be a DRAM memory of a given type and the other an SRAM memory. During screen refresh, screen refresh logic 200 of controller 103 receives display data from internal frame buffer 104*a* through a first-in-first-out memory 201 (FIFO A) and from external frame buffer 104*b* through first-in-first-out memory 202 and register 203. Screen refresh data are "alternatedly" received from FIFOs 201 and 202 and output to display 106 by screen refresh logic 200 during the raster scan of display 106.

In the embodiment illustrated in FIG. 2, internal frame buffer 104*a* has a 1 megabyte capacity and is constructed from a pair of parallel 256k by 16 DRAMS 204*a* and 204*b* (it should be noted that in alternate embodiments the random ports of video RAMS [VRAMs] may be used). As one skilled in the art will recognize, the integration of at least part of the frame buffer 104*a* within the display controller will alone improve bandwidth, notwithstanding the provision of external frame buffer 104*b*. The internal frame buffer 104*a* will have a substantially improved access speed since, among other things, the capacitive and inductive loading between controller 200 and memory 104*a* is substantially reduced in the absence of chip to chip interconnections. Preferably, the 16-bit words output from data ports DRAMs 204*a* and 204*b* are provided simultaneously in parallel as a 32-bit word to the inputs of FIFO 201. It should be noted that in addition to screen refresh accesses, other accesses are being made to frame buffer 104 while the display screen is being refreshed (e.g., writes to the on-screen space, reads/writes to the off screen space, DRAM cell refreshes, etc.).

In the embodiment of FIG. 2, one half a megabyte of external frame buffer 104*b* is provided as a 256k by 16 DRAM 205. Pairs of 16-bit words output from the data ports of DRAM 205 are received by register 203 and concatenated into 32-bit words which are then provided to the inputs of FIFO B 202.

While the integrated section 104*a* of frame buffer 104 advantageously provides high access speed memory, the external section 104*b* allows for the construction of a larger/expandable frame buffer 104 which cannot otherwise be provided by the integrated portion 104*a* alone. In other words, besides being un-expandable, the integrated memory 104*a* is limited in size by the ability to fabricate both memory and controller circuitry on a single yieldable chip. The external frame buffer 104*b* however remedies this disadvantage.

Generally, in the preferred embodiment, during screen refresh, two reads are made from FIFO A 201 for each read made from FIFO B 202. The number of reads per FIFO may vary however from application to application. The timing of the retrieval of data from internal DRAM 104*a* and external DRAM 104*b* is optimized to maintain the data queue in the corresponding FIFO using independent clocks. Preferably, the internal memory 104*a* and external memory 104*b* are each controlled by separate DRAM control signals (i.e. RAS, CAS, OE, etc.) Data is then output from FIFOs 201 and 202 respectively at a fixed rate based on the respective input rate. This substantially reduces the complexity of the DRAM timing: no complicated timing scheme must be used to maintain a stream of data as must be done when data is retrieved from banks of memory in an interleaved fashion.

The data from FIFOs 201 and 202 preferably directly maps to the screen of display 106. Assuming a pixel depth of 8 bits per pixel, each read of 32-bits from FIFO 201 corresponds to four pixels on the display screen (i.e., one 32-bit "entry" equals four 8-bit pixels). Therefore, the two reads from FIFO 201 will provide data for 8 consecutive pixels in the display raster scan. The following read of one 32-bit word from FIFO 202 provides the data for the next four pixels being generated in the raster scan. The numbers of pixels per word (entry) and the number of corresponding display pixels generated will vary as a function of the pixel depth accordingly.

The operating parameters for FIFO A and FIFO B in the preferred embodiment can be determined as follows. Initially, assume that only FIFO B (202) is being employed. The calculations will then be extended in the discussion below to the full two FIFO configuration of FIG. 2.

Single FIFO operation can generally be modeled in accordance with the time line of FIG. 3. At time $T_0$ FIFO B is assumed to be full with pixel data. At time $T_1$, it is assumed that substantially half of the data originally in FIFO B at time $T_0$ has been clocked out for screen refresh. Additionally, at time $T_1$, a half-full flag is set. During the intervening period $\Delta T_F$, other accesses (i.e. non-screen refresh operations such as block transfers, graphics data updates, etc. preferably through the controller/bus interface discussed below.) can be made to external memory 104*b*. Thus, a value for $\Delta T_F$ is chosen to allow for the performance of a typical number of these non-screen refresh cycles (both random and page mode)in accordance with:

$$\Delta T_F = X\Delta T_R + Y\Delta T_P$$

where X is the number of random cycles required, Y is the number of page mode cycles required, $\Delta T_R$ is the time required to complete each random cycle and $\Delta T_P$ is the time required to complete each page mode cycle. For DRAM, MDRAMS, and CDRAMS, a random cycle will be defined for discussion purposes as a RAS cycle plus a CAS cycle. (If SDRAMs or RDRAMs are used, "random cycle" denotes precharge plus one memory cycle; for SRAM one random cycle is equivalent to one page mode cycle which is equal to a memory access cycle.

As discussed above, each FIFO pipelines words or entries, each composed of the pixel data for one or more display pixels. The total number of entries which can be stored in FIFO B, $N_{IF}$, may be calculated as:

$$N_{IF} = \frac{\Delta T_F + \Delta T_0 + \Delta T_R}{\Delta T_D} + 0.9999$$

where 0.9999 is used to round up to the next higher value. $\Delta T_0$ is selected to allow an existing DRAM access to complete; normally; $\Delta T_0$ would be approximated as the time required to complete one random cycle ($\Delta T_R$) and one page mode cycle ($\Delta T_P$), but can be increased or decreased depending on the demands on the external memory 104*b*. Both $\Delta T_0$ and $\Delta T_F$ are defined by other non-screen refresh oriented memory accesses, such as graphics updates and block transfers, etc. It should be recognized that $\Delta T_0$ is selected to allow completion of a DRAM access whereas $\Delta T_F$ is set to the length of a complete memory access.

The value $\Delta T_D$ represents the time required to unload (clock-out) one entry from the FIFO and thus is dependent on the dot clock rate at which data is retrieved to refresh the display screen. Generally:

$$\Delta T_D = \frac{\text{Number of Pixels Per } FIFO \text{ Entry}}{\text{Dot Clock Rate}}$$

The value $N_{IFH}$ represents the number of entries left in the FIFO available for screen refresh between time $T_1$ and time $T_3$ (i.e. the number of entries remaining after the half-full flag has been set). The minimum number of entries can be calculated as:

$$N_{IFH} = \frac{\Delta T_0 + \Delta T_R}{\Delta T_D} + 0.9999$$

It should be noted that although $N_{IFH}$ is not a function of the actual size of the FIFO ($N_{IF}$) but must be less than $N_{IF}$.

Assuming that external DRAM 104*b* is a typical fast mode DRAM bank, that display 106 is driven at a dot clock rate of 75 MHz, the and that each entry is composed of 4 pixels (as discussed above, preferably 8 bits per pixel and 32 bits per entry), a single FIFO can be modeled as follows. For a fast mode DRAM, page mode cycles ($\Delta T_P$) are typically 40 ns and random cycles ($\Delta T_R$) are typically 140 ns. To set the value of $\Delta T_F$, it will be assumed that one random cycle and 10 page cycles will be required for other memory operations before the FIFO is half empty from display refresh retrievals. Therefore, $\Delta T_F$ will be 140+10×40 ns or 540 ns. From the equations given above:

$$\Delta T_D = \frac{4}{75 \text{ MHz}} = 53.3 \text{ nsec/entry}$$

hence:

$$N_{IF} = \frac{540 \text{ nsec} + 180 \text{ nsec} + 140 \text{ sec}}{53.3 \text{ nsec} + \text{entry}} + 0.9999 = 17 \text{ entries}$$

and:

$$N_{IFH} = \frac{180 \text{ nsec} + 140 \text{ nsec}}{53.3 \text{ nsec/entry}} + 0.9999 = 6 \text{ entries}$$

From the above discussion, the calculations can be extended to the multi-FIFO environment. As a first example, assume that external DRAM 205 operates with a $\Delta T_P$ of 40 nsec and a $\Delta T_R$ of 140 nsec and that internal DRAM 204 operates with a $\Delta T_P$ of 20 nsec and a $\Delta T_R$ of 110 nsec. In this case, assume that each entry in both FIFO 201 and FIFO 202 is 4 pixels wide. $\Delta T_F$ is assumed to remain the same as the example above at 540 nsecs. The sizes for FIFO A (201) and FIFO B (202) in this example are calculated to remain equivalent to a single FIFO of 17 entries, as follows.

For modelling purposes, assume that FIFO A and FIFO B both output to an imaginary FIFO at the input of refresh logic 200. DRAM bank 204 will output approximately twice as many pixels as DRAM bank 205 since its page mode cycle is approximately twice as fast. From above, $\Delta T_D$ for the imaginary single FIFO is 53.3 nsecs and thus will unload 12 pixels (i.e. eight from FIFO A and four from FIFO B) in:

$$\Delta T_D = 53.3\frac{\text{nsec}}{\text{entry}} \times 12 \text{ pixels} \div \frac{4 \text{ pixels}}{\text{entry}} = 159.9 \text{ nsec}$$

Hence:

$$\Delta T_{DA} = 159.9\frac{\text{nsec}}{\text{entry}} \div (8 \text{ pixels} \div 4 \text{ pixels/entry}) = 80\frac{\text{nsec}}{\text{entry}}$$

$$\Delta T_{DB} = 159.9\frac{\text{nsec}}{\text{entry}} \div \left(4 \text{ pixels} \div \frac{4 \text{ pixels}}{\text{entry}}\right) = 159.9\frac{\text{nsec}}{\text{entry}}$$

where $\Delta T_{DA}$ is calculated for FIFO A and $\Delta T_{DB}$ is the calculation for FIFO B. From the respective values of $\Delta T_P$ and $\Delta T_R$ for the corresponding DRAMs, the sizes of each FIFO can be calculated from the formulas set forth above: and $$N_{IFA} = \frac{540 \text{ nsec} + 150 \text{ nsec} + 110 \text{ nsec}}{80 \text{ nsec/entry}} + 0.9999 = 10 \text{ entries}$$

$$N_{IFB} = \frac{540 \text{ nsec} + 180 \text{ nsec} + 140 \text{ nsec}}{159.9 \text{ nsec/entry}} + 0.9999 = 6 \text{ entries}$$

$$N_{IFHA} = \frac{150 \text{ nsec} + 110 \text{ nsec}}{80 \text{ nsec/entry}} + 0.9999 = 4 \text{ entries}$$

$$N_{IFHB} = \frac{180 \text{ nsec} + 140 \text{ nsec}}{159.9 \text{ nsec/entry}} + 0.9999 = 2 \text{ entries}$$

As a second example, assume that the width of FIFO A (201) is doubled to eight (8) pixels per entry. In this case;

$$\Delta T_{DA} = 159.9\frac{\text{nsec}}{\text{entry}} \div (8 \text{ pixels} \div 8 \text{ pixels/entry}) = 159.9\frac{\text{nsec}}{\text{entry}}$$

$\Delta T_{DB}$=159.9 nsec/entry (from above)

$$N_{IFA} = \frac{540 \text{ nsec} + 150 \text{ nsec} + 110 \text{ nsec}}{159.9 \text{ nsec/entry}} + 0.9999 = 5 \text{ entries}$$

and $$N_{IFB} = \frac{540 \text{ nsec} + 180 \text{ nsec} + 140 \text{ nsec}}{159.9 \text{ nsec/entry}} + 0.9999 = 6 \text{ entries}$$

$$N_{IFHA} = \frac{150 \text{ nsec} + 110 \text{ nsec}}{159.9 \text{ nsec/entry}} + 0.9999 = 2 \text{ entries}$$

and $$N_{IFHB} = \frac{180 \text{ nsec} + 140 \text{ nsec}}{159.9 \text{ nsec/entry}} + 0.9999 = 2 \text{ entries}$$

As can be seen from the second example, the overall size of FIFO A has been reduced due to effectively higher bandwidth. As a final example, assume that all factors remain the same except that three (3) times the number of pixels per entry are received from internal memory 104*a* stored in FIFO A as are received from external memory 104*b* and stored in FIFO B. While $\Delta T_D$ remains the same, in this case:

$$\Delta T_{DA} = 159.9\frac{\text{nsec}}{\text{entry}} \div (9 \text{ pixels} \div 8 \text{ pixels/entry}) = 142\frac{\text{nsec}}{\text{entry}}$$

$$\Delta T_{DB} = 159.9\frac{\text{nsec}}{\text{entry}} \div (3 \text{ pixels} \div 4 \text{ pixels/entry}) = 213\frac{\text{nsec}}{\text{entry}}$$

$$N_{IFA} = \frac{540 \text{ nsec} + 150 \text{ nsec} + 110 \text{ nsec}}{142 \text{ nsec/entry}} + 0.9999 = 6 \text{ entries}$$

In this final example, the overall size of FIFO A has again shrank due to higher effective bandwidth.

Figure 4:
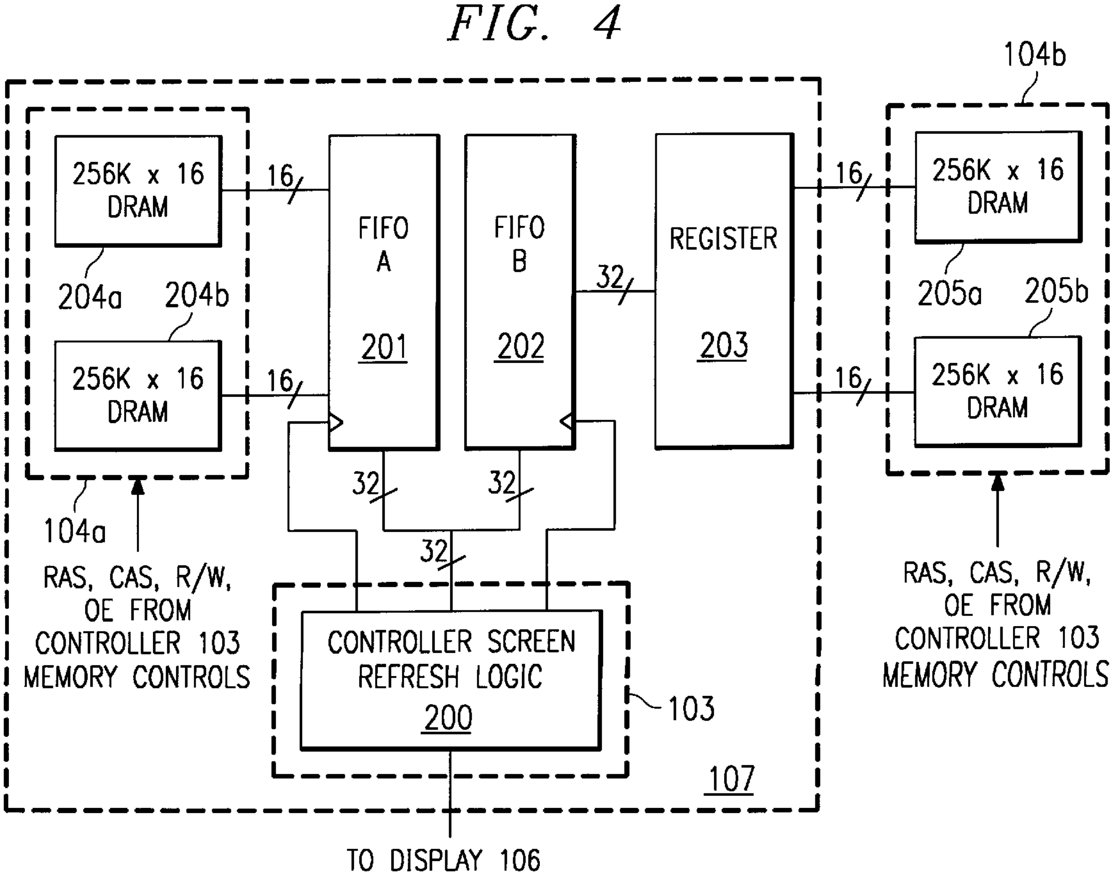
FIG. 4 is a more detailed functional block diagram emphasizing the refresh control portions of the controller and frame buffer of FIG. 1 according to a second illustrative embodiment of the present invention.

FIG. 4 depicts an alternate frame buffer interface/partitioning which demonstrates the expandability of the frame buffer 104 according to the principles of the present invention. In the system of FIG. 3, external frame buffer 104*b* is constructed with two 256k by 16 DRAMs 205*a* and 205*b* (1 megabyte of external memory) In this case, 32-bit words are always input to register 205 with each cycle. In alternate embodiments, register 205 may be foregone and data transferred directly from external frame buffer 104*b* to FIFO B 202. Assuming a nominal external frame buffer 104*b* bandwidth of 80 megabytes per second and that the internal frame buffer 104*a* is a 1 megabyte memory with a bandwidth of 160 megabytes per second, the overall rate at which screen refresh logic 200 receives data is increased to approximately 240 megabytes per second. Thus, the embodiment of FIG. 4 has improved performance (i.e., increased bandwidth) and greater storage capacity. Not only will the embodiment support each of the displays in Table I, but also provides additional space and bandwidth which may be used by controller 103 for the storage of off-screen data.

Figure 5:
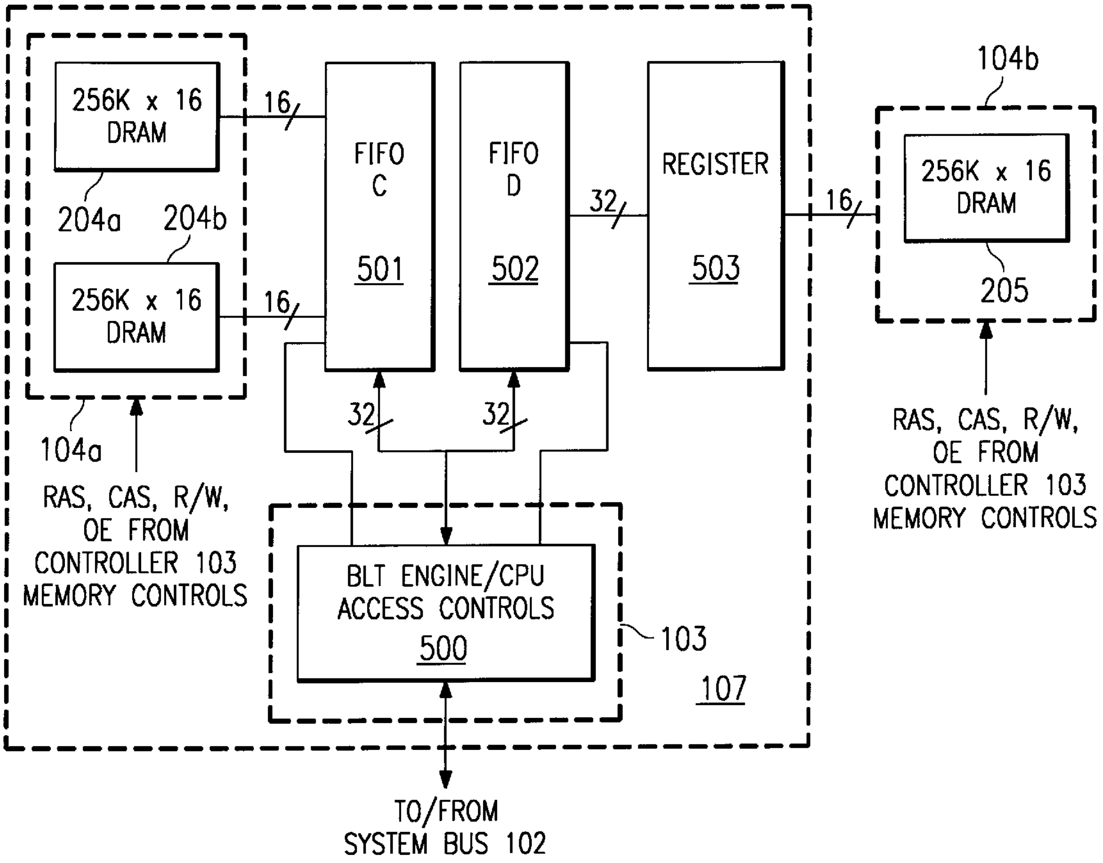
FIG. 5 is a functional block diagram emphasizing the system bus/CPU interface portions of the controller and frame buffer of FIG. 1 according to the first illustrative embodiment of the present invention.

FIG. 5 is a functional block diagram of the display controller 103/system bus 102 interface according to the principles of the present invention. Display controller 103 pipelines data to the system bus 102 through conventional BLT engine/CPU access controls 500 during such operations as block transfers and graphics data updates, etc. A pair of first-in-first-out memories (registers) 501 and 502 and register 503 queue data to or from internal frame buffer 104*a* and external memory 104*b* to BLT engine/controls 500 in a manner discussed above with regards to the display refresh interface. The size and timing relationships for FIFOs 501 and 502 can be calculated using the same equations discussed above except that these calculations are based on the timing of the CPU accesses; in this case, the refresh accesses previously discussed become the "other accesses." For example, $\Delta T_F$ now defines the period during which refresh accesses are being made (in contrast, during sizing of refresh FIFOs 201 and 202 $\Delta T_F$ represents the time during which non-screen refresh operations, such as block transfers and graphics data updates, are made).

Although the present invention and its advantages have been described in detail, it should be understood that various changes, substitutions and alterations can be made herein without departing from the spirit and scope of the invention as defined by the appended claims.

What is claimed is:

1. A processing system comprising:

processing circuitry fabricated on an integrated circuit chip;

an internal memory fabricated of said chip;

a first first-in-first-out memory having an input for receiving data retrieved from said internal memory and an output for providing data to said processing circuitry;

an external memory; and a second first-in-first-out memory having an input for receiving data retrieved from said external memory and an output for providing data to said processing circuitry, wherein said data received at said input of said first first-in-first-out memory is received asynchronously with respect to said data received at said input of said second first-in-first-out memory.

2. The processing system of claim 1 and further comprising a register interfacing said external memory and said second first-in-first-out memory.

3. The processing system of claim 1 wherein said processing circuitry comprises display refresh control circuitry.

4. The processing system of claim 1 wherein said processing circuitry provides an interface with a system bus.

5. The processing system of claim 1 wherein processing circuitry comprises a controller.

6. The processing system of claim 1 wherein said internal memory provides data to said first first-in-first-out memory at a rate greater than a rate at which said external memory provides data to said second first-in-first-out memory.

7. The processing system of claim 1 wherein said first-in-first-out-memories are fabricated on said chip.

8. A data processing system comprising:

an integrated circuit fabricated on a single chip comprising:

a controller;

internal memory for providing data at a first predetermined rate through a corresponding data port; and a first first-in-first-out memory interfacing said data port of said internal memory and a input port of said controller; and a second first-in-first-out memory disposed in parallel with said first first-in-first-out memory and having an output coupled to said input port of said controller; and external memory for providing data at a second predetermined rate through a corresponding data port coupled to an input of said second first-in-first-out memory, wherein said first predetermined rate is greater than said second predetermined rate.

9. The system of claim 8 wherein said controller includes a graphics controller.

10. The system of claim 8 wherein said controller includes a video controller.

11. The system of claim 8 wherein said first first-in-first-out memory has a width of 32 bits for queuing 32-bit words for output to said controller.

12. The system of claim 8 wherein said second first-in-first-out memory has a width of 32 bits for queuing 32 bits for output to said controller.

13. The system of claim 12 and further comprising a register coupling said second first-in-first-out memory and said external frame buffer, said register receiving words of a first number of bits from said external frame buffer and outputting words of a second number of bits to said second first-in-first-out memory.

14. The system of claim 8 wherein said external and internal memories are independently clocked.

15. The system of claim 8 wherein said second first-in-first-out memory is fabricated on said chip.

16. A display system comprising:

a display for displaying data as a plurality of pixels on a display screen;

a frame buffer for storing words of pixel data defining characteristics of corresponding pixels on said display screen, said frame buffer including an internal portion forming a first part of an integrated controller/frame buffer device and an external portion;

a controller forming a second part of said integrated controller/frame buffer device for controlling the transfer of words of pixel data from said frame buffer to said display; and interface circuitry forming a third part of said integrated device comprising:

a first first-in-first-out memory for queuing words of pixel data being transferred from said internal portion of said frame buffer to said controller; and a second first-in-first-out memory for queuing words of pixel data being transferred from said external portion of said frame buffer to said controller, wherein data is output from said first first-in-first-out memory to said controller at a first rate greater than a second rate at which data is output from said second first-in-first-out memory to said controller.

17. The system of claim 16 wherein said internal portion of said frame buffer comprises a dynamic random access memory.

18. The system of claim 16 wherein said external portion of said frame buffer comprises a dynamic random access memory.

19. The system of claim 16 wherein said internal portion of said frame buffer comprises a static random access memory.

20. The system of claim 16 wherein said external portion of said memory comprises a static random access memory.

21. A method for interfacing a controller with a memory:

receiving first data from an internal memory at a first rate at the input of a first first-in-first-out memory;

receiving second data from an external memory at a second rate at the input of a second first-in-first-out memory said first rate greater than said second rate;

outputting a predetermined number of words of the first data from the first first-in-first-out memory to the controller; and outputting at least one word of the data from the second first-in-first-out memory to the controller.

22. The method of claim 21 and further comprising the step of:

receiving first and second words of selected lengths from the external memory;

concatenating the first and second words into a single word; and transmitting the single word to the second first-in-first-out memory.

23. The method of claim 21 wherein said step of receiving first data comprises a step of receiving pixel data from an internal frame buffer.

24. The method of claim 23 wherein said step of receiving second data comprises a step of receiving pixel data from an external frame buffer.

25. The method of claim 23 wherein said predetermined number of words comprises four words.

26. A processing system comprising:

a memory for storing words of data, said memory including an internal portion forming a first part of an integrated device and an external portion;

a controller forming a second part of said integrated controller device for controlling the transfer of words of data from said memory to a bus; and interface circuitry forming a third part of said integrated device comprising:

a first first-in-first-out memory for queuing words of data being transferred between said internal portion of said frame buffer and said bus by said controller; and a second first-in-first-out memory for queuing words of data being transferred between said external portion of said frame buffer to said bus by said controller, wherein data is transferred through said first first-in-first-out memory at a first rate different from a second rate at which data is transferred through said second first-in-first-out memory.

27. The system of claim 26 wherein said memory comprises a frame buffer and said data comprises pixel data.

28. The system of claim 26 wherein said bus comprises a system bus for interfacing said integrated device and said memory with a CPU.

* * * * *